United States Patent [19]

Short, III

[11] Patent Number: 4,706,698
[45] Date of Patent: Nov. 17, 1987

[54] TEMPERATURE RESPONSIVE PRESSURE RELIEF APPARATUS AND METHOD

[75] Inventor: Edward H. Short, III, Tulsa, Okla.

[73] Assignee: BS&B Safety Systems, Inc., Tulsa, Okla.

[21] Appl. No.: 789,186

[22] Filed: Oct. 18, 1985

[51] Int. Cl.$^4$ ............................................. F16K 17/14
[52] U.S. Cl. ..................................... 137/68.1; 137/72; 137/74; 220/89 A; 220/89 B
[58] Field of Search ............... 137/68.1, 72, 73, 74; 220/89 A, 89 B

[56] References Cited

U.S. PATENT DOCUMENTS

| | | | |
|---|---|---|---|
| 1,068,675 | 7/1913 | Lightfoot | 220/89 B |
| 1,303,248 | 5/1919 | Breidenbach | 137/68.1 X |
| 1,973,182 | 9/1974 | Shaw | 220/89 B |
| 2,302,029 | 11/1942 | Hulsmann | 137/72 X |
| 2,862,641 | 12/1958 | Philipp | 220/89 A |
| 3,906,976 | 9/1975 | Nohr | 220/89 B X |
| 4,195,745 | 4/1980 | Roberts | 137/68 R |
| 4,365,643 | 12/1982 | Masclet | 137/72 X |
| 4,549,565 | 10/1985 | Short | 137/68.1 |

*Primary Examiner*—Harold W. Weakley
*Attorney, Agent, or Firm*—Laney, Dougherty, Hessin & Beavers

[57] ABSTRACT

A fluid pressure relief apparatus of the rupturable type which ruptures at different pressures depending upon the temperature of the fluid in contact therewith. A rupture member is provided supported by a support member which is maintained in place by a material having a selected melting point. When the fluid under pressure reaches the temperature at which the material melts, the support member ceases to support the rupture member causing the pressure at which rupture occurs to be lowered. A method of relieving pressurized fluid at a predetermined pressure level when the temperature of said fluid is below a preselected temperature and at a lower pressure level when the temperature is above said preselected temperature is also provided.

5 Claims, 7 Drawing Figures

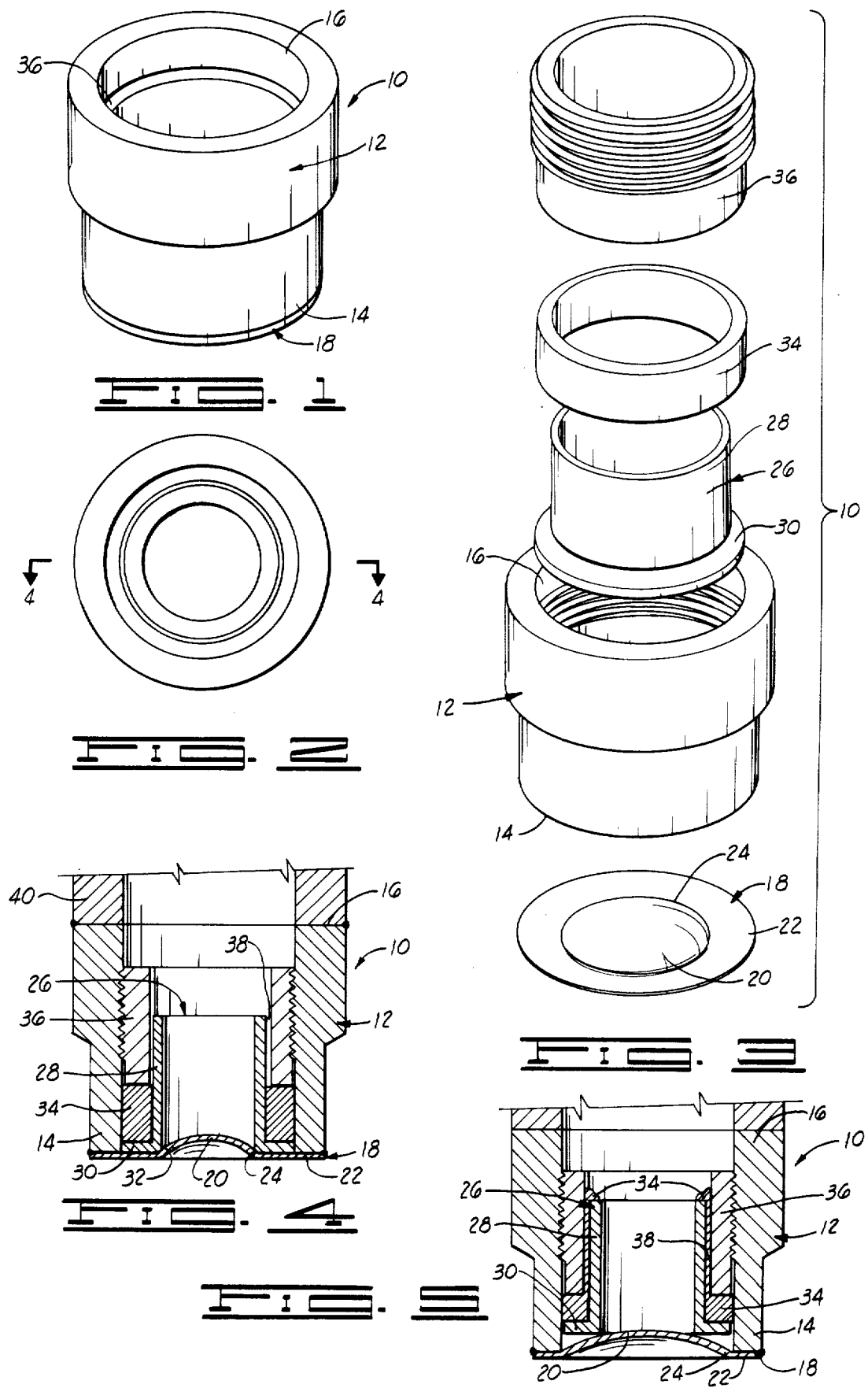

TEMPERATURE RESPONSIVE PRESSURE RELIEF APPARATUS AND METHOD

BACKGROUND OF THE INVENTION

1. Field of the Invention

The present invention relates to temperature responsive pressure relief apparatus and methods, and more particularly, but not by way of limitation, to a fluid pressure relief apparatus of the rupturable type wherein the temperature as well as the pressure of the fluid influence of the operation of the apparatus.

2. Description of the Prior Art

A variety of fluid pressure relief apparatus of the rupturable type have been developed and used heretofore. Such devices commonly include a rupturable member or disk supported in a pressure relief area so that when the fluid pressure exerted on the rupture member exceeds a predetermined level, rupture occurs and fluid pressure is relieved.

In some applications for fluid pressure relief apparatus, the fluid under pressure can undergo a rapid increase in temperature without a corresponding rapid increase in pressure. For example, in the chemical industry where a reaction product is produced, the reaction normally takes place at a certain temperature and pressure. If control of the reaction is lost and it takes place at too high a rate, the temperature can rapidly increase without an appreciable increase in pressure. In such applications, it is generally desirable for pressure relief to occur when the temperature of the fluid under pressure reaches a predetermined level.

Fluid pressure relief apparatus of the rupturable type used heretofore operate primarily in response to the pressure level of the fluid in contact therewith, and while the temperature of the fluid affects the rupture pressure to a small degree, accurate control of the rupture pressure based on temperature has not been possible. Thus, there is a need for a temperature responsive rupturable pressure relief apparatus whereby accurate control of the pressure at which the apparatus ruptures at different temperatures is achieved.

SUMMARY OF THE INVENTION

The present invention provides a fluid pressure relief apparatus of the rupturable type capable of rupturing at different pressure levels depending upon the temperature of the pressurized fluid in contact therewith. The apparatus includes a hollow body member having a rupture member sealingly connected thereto. A support member is positioned interiorly of the body member adjacent the rupture member whereby the rupture member is supported and caused to rupture at a predetermined rupture pressure thereby. The support member is maintained in place by a solid material having a selected melting point so that when the temperature of the fluid under pressure reaches a level whereby the material is heated to the melting point thereof, the material melts and the support of the rupture member by the support member ceases. The lack of support by the support member causes the pressure level at which the rupture member ruptures to be lowered. A method of relieving pressurized fluid at a predetermined pressure level when the temperature of the fluid is below a preselected temperature and at a lower pressure level when the temperature is above the preselected temperature is also provided.

It is, therefore, a general object of the present invention to provide a temperature responsive pressure relief apparatus and method.

A further object of the present invention is the provision of a method and fluid pressure relief apparatus wherein pressurized fluid is relieved at different preselected pressures depending upon the temperature of the fluid.

Still a further object of the present invention is the provision of a fluid pressure relief apparatus of the rupturable type which under normal temperature conditions ruptures at a predetermined pressure, but which ruptures at a lower pressure if the temperature of the fluid in contact therewith increases to a preselected temperature.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a perspective view of a preferred embodiment of the apparatus of the present invention.

FIG. 2 is a top view of the apparatus of FIG. 1.

FIG. 3 is a perspective view of the several parts of the apparatus of the present invention shown in their order of assembly.

FIG. 4 is a cross-sectional view taken along line 4—4 of FIG. 2.

FIG. 5 is a cross-sectional view similar to FIG. 4, but showing the apparatus after partial operation.

DESCRIPTION OF PREFERRED EMBODIMENTS

Figure 6:
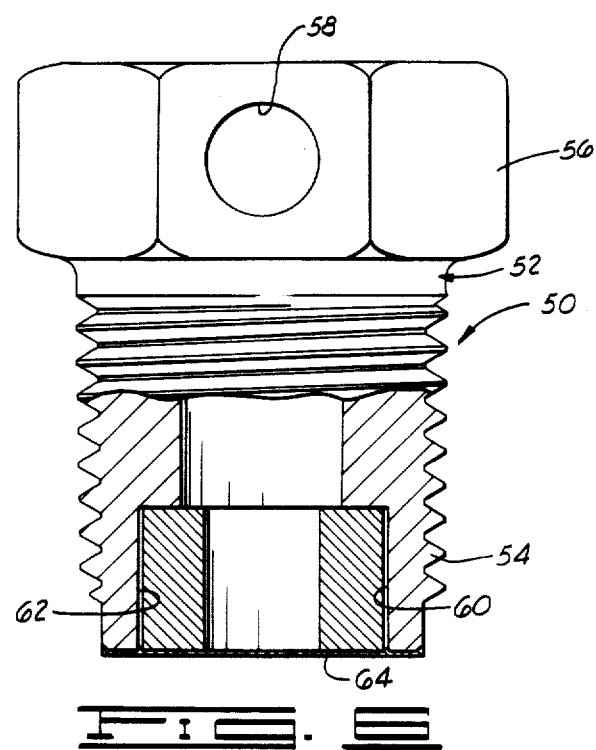
FIG. 6 is a partially cross-sectional view of an alternate embodiment of the present invention.

Referring now to the drawings, and specifically to FIGS. 1-5, a preferred embodiment of the pressure relief apparatus of the present invention is illustrated and generally designated by the numeral 10. As best shown in FIGS. 1-4, the apparatus 10 includes a hollow body member 12 having an inlet end 14 and an outlet end 16. While the body member 12 can take a variety of shapes and forms, a cylindrical shape and configuration whereby at least the inlet end 14 of the body member extends into the pressurized fluid and is heated thereby are generally preferred.

A rupture member 18, preferably of a circular or disk shape, is sealingly attached to the inlet end 14 of the body member 12. As best shown in FIGS. 3 and 4, the rupture member 18 can include a concave-convex portion 20 connected to an annular flange portion 22 by a transition connection 24. The size of the rupture member 18, i.e., the diameter thereof, corresponds to the outside diameter of the body member 12 at its inlet end 14, and the rupture member 18 is seal welded or otherwise sealingly connected to the inlet end 14 of the body member 12 around the periphery thereof so that fluid under pressure is prevented from entering the interior of the body member 12 so long as the rupture member 18 is intact.

A support member 26 having a cylindrical portion 28 and an annular flat flange portion 30 is preferably disposed within the interior of the body member 12. More specifically, as best shown in FIG. 4, the annular flat flange portion 30 of the support member 26 is positioned adjacent the part of the annular flange portion 22 of the rupture member 18 which is unsupported by the body member 12. The internal rounded corner 32 of the support member 26, i.e., the corner formed by the intersection of the annular flange portion 30 and the cylindrical portion 28 thereof, is positioned adjacent the transition connection 24 of the rupture member 18 thereby supporting the transition connection. Thus, as will be described in greater detail hereinbelow, when the annular flange portion 30 and the internal corner 32 of the support member 26 are positioned adjacent the rupture member 18 as shown in FIG. 4, the annular flange portion 22 and transition connection 24 of the rupture member 18 are prevented from deforming as a result of fluid pressure exerted on the other side of the rupture member 18.

Referring specifically to FIGS. 3 and 4, a support ring 34 is positioned within the annular space between the body member 12 and the cylindrical portion 28 of the support member 26. As will be discussed further herinbelow, the support ring 34 is formed of a material having a selected melting point and functions to maintain the support member 26 against the rupture member 18. The body member 18 includes a cylindrical retainer 36 therewithin providing an annular shoulder 37 for retaining the support ring 34 and the support member 26 in a position supporting the rupture member 18 as shown in FIG. 4. The retainer 36 can be integrally formed in the body member 12 or it can be removably threadedly connected therewithin. That is, the body member 12 can include threads disposed around the interior surface thereof which matingly engage threads on the exterior surface of the retainer 36.

In the embodiment shown in FIGS. 1–5, the retainer 36 has an internal diameter slightly larger than the external diameter of the cylindrical portion 28 of the support member 26 so that an annular space 38 is provided communicating the interior of the body member 12 with the annular space within which the support ring 34 is substantially confined. By substantially confining the support ring 34 between the support member 26, the body member 12 and the retainer 36, the support ring material is prevented from prematurely deforming and ceasing to support the support member and rupture disk as the temperature approaches the melting point of the material. In applications where the normal temperature of the fluid in contact with the apparatus 10 is well below the melting point of the material forming the support ring and the temperature of the fluid rises quickly, the substantial confinement of the support ring is not necessary.

OPERATION OF THE APPARATUS 10

In operation, the apparatus 10 is connected within a pressure relief area so that upon the rupture of the rupture member 18, pressure is relieved through the body member 12 from the inlet end 14 to the outlet end 16 thereof. As shown in FIGS. 4 and 5, the outlet end 16 of the body member 12 can be seal welded to a complementary cylindrical fitting 40 whereby a fluid relief passageway is provided which leads fluids flowing through the body member 12 to a desired relief location. In this arrangement, the entire apparatus 10 is disposed within a vessel or other pressure system containing fluid under pressure and is heated or cooled by changes in the temperature of the fluid.

As indicated above, the material from which the support ring 34 is formed has a preselected melting point. When the temperature of the fluid under pressure to which the apparatus 10 is exposed is below the melting point of the support ring 34, the support member 26 is maintained in place by the support ring 34 and the rupture member 18 operates in a conventional manner, i.e., the concave-convex portion 20 ruptures when a predetermined fluid pressure is exerted on the convex side thereof.

In the event the temperature of the fluid under pressure reaches a level whereby the support ring 34 is heated to its melting point or above, the material forming the support ring 34 melts and flows through the annular passageway 38 which in turn allows the support member 26 to be moved away from the rupture member 18 whereby the rupture member 18 deforms under pressure as shown in FIG. 5. That is, once the support ring 34 melts, the annular flange portion 22 and transition connection 24 of the rupture disk 18 are no longer supported by the support member 26. Consequently, the rupture member 18 deforms and the support member 26 is moved upwardly. The pressure deformation of the rupture member 18 moves the transition connection 24 outwardly until it reaches the interior of the body member 12 i.e., the concave-convex portion 20 of the rupture member 18 enlarges to a diameter equal to the inside of the body member 12 at its inlet end 14. As is well understood by those skilled in the art, when the concave-convex portion of the rupture member 18 is enlarged, the pressure at which it ruptures is lowered. Thus, in operation of the apparatus 10, when the temperature of the fluid under pressure reaches the melting point of the support ring 34 causing the rupture member 18 to deform under pressure and the concave-convex portion 20 thereof to be enlarged, the pressure at which the member 18 ruptures is lowered. By controlling the size of the various parts of the apparatus 10 which in turn controls the initial and final sizes of the concave-convex portion 20 of the rupture member 18, the fluid pressure at which the member 18 ruptures, both before and after the support ring 34 melts, can be precisely determined and controlled.

As mentioned above, the support member 26 shown in the drawings and described above is not essential to the operation of the apparatus 10. That is, in applications where the temperature of the pressurized fluid is normally well below the melting point of the support ring and when a temperature rise in the fluid occurs quickly, the support member 26 can be left out of the apparatus 10. Instead, an enlarged support ring 34 can be utilized whereby the support ring directly contacts and supports the annular flange portion 22 and transition connection 24 of the rupture member 18.

In applications where precise control of the operation of the apparatus 10 is required, the use of the support member 26 is preferred in that the rupture member 18 will deform more accurately, i.e., the melting of the support ring will take place within a narrow temperature range as compared to the apparatus 10 without the support member 26. More specifically, when the support member 26 is used, the cylindrical portion 28 thereof serves to substantially confine the support ring 34 in the annular space defined by the interior walls of the body 12, the bottom surface of the retainer 36 and the flange portion 30 of the support member 26 so that the material from which the support ring 34 is formed cannot escape the space until it has melted to the point where it is sufficiently fluid to flow through the relatively narrow annular space 38. Thus, as the temperature of the fluid under pressure rises past the melting point of the material from which the support ring 34 is formed and the support ring becomes soft, the rupture member 18 will not deform until the material becomes fluid enough to be forced through the space 38. If even more accurate control is desired, one or more apertures of specific size can be provided in the cylindrical portion 28 of the member 26 communicating the space containing the support ring 34 with the interior of the member 26.

Figure 7:
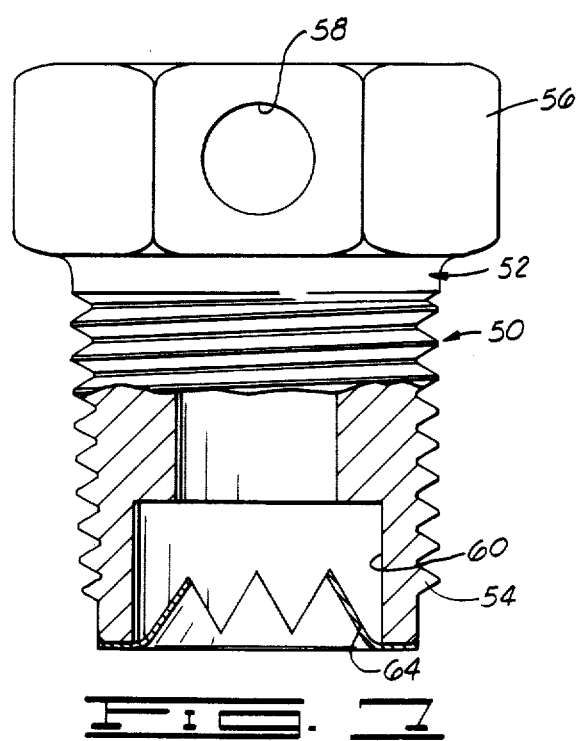
FIG. 7 is a cross-sectional view similar to FIG. 6, but showing the apparatus after operation.

Referring now to FIGS. 6 and 7, an alternate embodiment of the apparatus of the present invention wherein the support member is itself formed of the material having a selected melting point is illustrated and generally designated by the numeral 50. The apparatus 50 does not include a separate support ring, the rupture disk thereof is initially flat and the body member thereof includes threads for threaded engagement in a coupling or threaded bore disposed in a pressure vessel or system. More specifically, the apparatus 50 includes a hollow body member 52 having a threaded cylindrical portion 54 and a flat sided hex-head portion 56 for facilitating the threaded connection of the threaded cylindrical portion in a complementary fitting. The hollow interior of the cylindrical portion 54 is communicated with one or more openings 58 provided in the hex-head portion 56.

The threaded cylindrical portion 54 of the body 50 includes an internal counterbore 60 within which a support member 62 is disposed formed of a material having a selected melting point. A flat rupture disk 64 is seal welded to the end of the threaded cylindrical portion 54 of the body 50 whereby a portion of the rupture disk 64 is supported by the support member 62.

As mentioned, the body 50 is threadedly engaged in a threaded fitting connected to a pressure vessel or system whereby fluid pressure from the vessel or system is exerted on the rupture disk 64 and is prevented from flowing through the body member 52 into the atmosphere by way of the port or ports 58 therein by the rupture disk 64.

The operation of the apparatus 50 is similar to the operation of the apparatus 10 described above in that the rupture disk 64 thereof is sealingly placed in a fluid relief passageway by threadedly engaging the body member 52 in a complementary fitting whereby the rupture member 64 contains pressurized fluid until and unless rupture occurs. The rupture member 64 has a predetermined rupture pressure when supported by the particular size of support member 62 held within the body member 52 by the counterbore 60 therein. When the rupture member 64 is not supported by the support member 62, it ruptures at a predetermined lower pressure due to its larger unsupported size.

As long as the temperature of the pressurized fluid exerted on the rupture member 64 is below the melting point of the support member 62, the rupture member 64 ruptures and relieves pressurized fluid at the supported predetermined pressure level. However, when the temperature of the pressurized fluid reaches a level whereby the material forming the support member 62 is heated to the melting point thereof, the material melts and the support of the rupture member 64 thereby ceases. This, in turn, lowers the predetermined rupture pressure of the rupture member 64 and when such lower pressure is exerted thereon by the pressurized fluid, the rupture member 64 ruptures as shown in FIG. 7 relieving pressurized fluid through the apparatus 50.

In order to more clearly illustrate the operation of the apparatus 10, the following examples are given.

EXAMPLE 1

An application for a fluid pressure relief apparatus requires that relief occur at a fluid pressure in the range of from 4300 psi. to 4700 psi. at temperatures up to 750° F. At temperatures above 750° F., pressure relief must occur at a fluid pressure in the range of from 3100 psi. to 3500 psi.

Apparatus 10 of the present invention which meets the foregoing requirements includes a body member 12 having an inside diameter of 2.156 inches and a length of 3 inches. A rupture disk 18 formed of a nickel-chromium alloy is seal welded to the inlet end 14 of the body member 12 having a 1.5 inch diameter concave-convex portion 20 which ruptures at from 4300 psi. to 4700 psi. The support member 26 has an internal diameter of 1.5 inches, and the support ring 34 is formed of a zinc-alum eutectic alloy having a melting point of 720° F.

In operation of the apparatus 10 described above, when the temperature of the fluid under pressure reaches 720° F., the zinc-alum support ring begins to melt. By the time the temperature reaches 750° F., the support ring 34 has melted enough to flow through the passageway 38, and the disk 18 reforms to a diameter of 2.156 inches. The reformed concave-convex portion 20 ruptures at a fluid pressure of from 3100 psi. to 3500 psi.

EXAMPLE 2

An application for a fluid pressure relief apparatus requires that relief occur at a fluid pressure of about 5000 psi. at temperatures up to 197° F. At temperatures above 197° F., pressure relief must occur at a fluid pressure of about 2200 psi.

Apparatus 50 of the present invention which meets the foregoing requirements include a body 52 having an inside diameter at the counterbore 60 of 0.260 inch. A rupture disk 64 formed of Inconel 600 alloy is seal welded to the end of the threaded cylindrical portion 54 of the body 52 and a support member 62 having an inside diameter of 0.114 inch formed of fusible alloy eutectic solder is disposed within the counterbore 60. The support member 62 has a melting point of 197° F. Prior to the melting of the support ring 62 the rupture disk 64 has a rupture pressure of about 5000 psi. After the support ring 62 melts and ceases to support the rupture disk 64, the rupture disk 64 has a rupture pressure of about 2200 psi.

In operation of the apparatus 50 described above, when the temperature of the fluid under pressure reaches 197° F., the support ring 62 melts and ceases to support the disk 64. The unsupported disk 64 then ruptures at a fluid pressure of about 2200 psi.

Thus, the present invention is well adapted to carry out the objects and attain the ends and advantages mentioned as well as those inherent therein. While presently preferred embodiments of the invention have been described for purposes of this disclosure, numerous changes in the construction and arrangement of parts can be made by those skilled in the art. Such changes are encompassed within the spirit of this invention as defined by the appended claims.

What is claimed is:

1. A fluid pressure relief apparatus of the rupturable type which ruptures at different pressure levels depending upon the temperature of the fluid under pressure in contact therewith which comprises:

a hollow body member;

a rupture member sealingly attached to said body member; and a support member positioned interiorly of said body member adjacent said rupture member whereby said rupture member is supported and caused to rupture at a predetermined rupture pressure thereby, said support member being maintained in place by a solid material substantially confined between said support member and said body member having a selected melting point so that when the temperature of said fluid under pressure reaches a level whereby said material is heated to the melting point thereof, said support member is no longer maintained in place and the support of said rupture member is ceased thereby causing the pressure level at which said rupture member ruptures to be lowered.

2. The apparatus of claim 1 wherein said solid material having a selected melting point is in the form of a support ring positioned between said support member and an annular shoulder disposed within said body member.

3. The apparatus of claim 2 wherein said annular shoulder disposed within said body member is provided by a cylindrical retainer threadedly attached within said body member.

4. A fluid pressure relief apparatus of the rupturable type which ruptures at different pressures depending upon the temperature of the fluid under pressure in contact therewith which comprises:

a cylindrical body having a fluid inlet end and a fluid outlet end;

a rupture member sealingly connected across the fluid inlet end of said body having a concave-convex portion connected to an annular flange portion by a transition connection;

a support member having a cylindrical portion and an annular flange portion disposed within said body, said annular flange portion being positioned adjacent and supporting said annular flange portion and transition connection of said rupture member whereby said rupture member is prevented from deforming under pressure and said cylindrical portion being positioned coaxially with said body whereby an annular space is provided between the interior of said body and the exterior of said support member;

a support ring disposed within said annular space between said body and said support member for maintaining said flange portion of said support member adjacent said annular flange portion of said rupture member, said support ring being formed of a material having a selected melting point so that when the temperature of said fluid under pressure reaches a level whereby said support ring is heated to said melting point, said support ring melts and said rupture member deforms under pressure whereby said concave-convex portion thereof is enlarged and the pressure at which said rupture member ruptures is lowered; and means for retaining said support ring within said annular space between said body and said support member attached to said body.

5. The apparatus of claim 4 wherein said means for retaining said support ring within said annular space between said body and said support member comprise:

a cylindrical retaining member positioned coaxially within said body having threads on an exterior surface thereof and having an annular shoulder contacting said support ring, said cylindrical retaining member having an inside diameter slightly larger than the outside diameter of said cylindrical portion of said support member whereby a space is provided therebetween; and said body including threads on an interior surface thereof for matingly engaging said exterior threads on said cylindrical member.

* * * * *

UNITED STATES PATENT AND TRADEMARK OFFICE
CERTIFICATE OF CORRECTION

PATENT NO. : 4,706,698

DATED : November 17, 1987

INVENTOR(S) : Edward H. Short, III

It is certified that error appears in the above-identified patent and that said Letters Patent are hereby corrected as shown below:

Column 1, line 13, delete the word "of" (first occurrence);
Column 3, line 25, delete the numeral "18" and substitute the numeral --12-- therefore; and
Column 4, line 59, delete the word "narrow" and substitute the word --narrower-- therefore.

Signed and Sealed this

Seventh Day of June, 1988

Attest:

DONALD J. QUIGG

*Attesting Officer*     *Commissioner of Patents and Trademarks*